US009652544B2

(12) United States Patent
Dorohonceanu et al.

(10) Patent No.: US 9,652,544 B2
(45) Date of Patent: May 16, 2017

(54) GENERATING SNIPPETS FOR PROMINENT USERS FOR INFORMATION RETRIEVAL QUERIES

(71) Applicant: Google Inc., Mountain View, CA (US)

(72) Inventors: Bogdan Dorohonceanu, New Brunswick, NJ (US); John E. Saalweachter, New York, NY (US); Kumar Mayur Thakur, West Orange, NJ (US); Sheng Zhang, Jersey City, NJ (US)

(73) Assignee: Google Inc., Mountain View, CA (US)

( * ) Notice: Subject to any disclaimer, the term of this patent is extended or adjusted under 35 U.S.C. 154(b) by 153 days.

(21) Appl. No.: 14/789,176

(22) Filed: Jul. 1, 2015

(65) Prior Publication Data
US 2015/0302101 A1    Oct. 22, 2015

Related U.S. Application Data

(63) Continuation of application No. 13/645,144, filed on Oct. 4, 2012, now Pat. No. 9,087,130.

(51) Int. Cl.
*G06F 17/30*    (2006.01)
(52) U.S. Cl.
CPC .... *G06F 17/30867* (2013.01); *G06F 17/3051* (2013.01); *G06F 17/30528* (2013.01); *G06F 17/30864* (2013.01)
(58) Field of Classification Search
None
See application file for complete search history.

(56) References Cited

U.S. PATENT DOCUMENTS

| 7,725,501 B1 | 5/2010 | Stillman et al. |
| 8,276,207 B2 | 9/2012 | Walsh et al. |
| 9,047,345 B1 * | 6/2015 | Liu .................. G06F 17/30867 |

(Continued)

FOREIGN PATENT DOCUMENTS

WO    WO2014055764 A3    7/2014

OTHER PUBLICATIONS

International Search Report and Written Opinion in International Application No. PCT/US13/63269, mailed Apr. 21, 2014, 9 pages.

(Continued)

*Primary Examiner* — Jay Morrison
(74) *Attorney, Agent, or Firm* — Fish & Richardson P.C.

(57) ABSTRACT

Implementations include receiving trigger query data, the trigger query data identifying one or more trigger queries and one or more sets of authoritative users, each set of authoritative users being associated with a respective trigger query, providing a plurality of trigger query and authoritative user pairs, each trigger query and authoritative user pair identifying a trigger query and an authoritative user from a set of authoritative users associated with the trigger query, for each trigger query and authoritative user pair: generating a snippet based on user data, the user data being associated with the authoritative user in one or more computer-implemented services, each snippet being specific to the trigger query and specific to the authoritative user, and storing one or more snippets in computer-readable memory, each snippet being associated with the trigger query and the authoritative user for which the snippet was generated.

20 Claims, 6 Drawing Sheets

(56) References Cited

U.S. PATENT DOCUMENTS

| | | |
|---|---|---|
| 2003/0009448 A1 | 1/2003 | Covington et al. |
| 2003/0212648 A1 | 11/2003 | Cunningham et al. |
| 2007/0214121 A1* | 9/2007 | Ebanks ............ G06F 17/30867 |
| 2009/0171933 A1 | 7/2009 | Schachter |
| 2010/0115003 A1 | 5/2010 | Soules et al. |
| 2011/0072035 A1 | 3/2011 | Gaucas et al. |
| 2011/0107374 A1 | 5/2011 | Roberts et al. |
| 2011/0307496 A1 | 12/2011 | Jones et al. |
| 2012/0117049 A1 | 5/2012 | Zhou |
| 2013/0097144 A1 | 4/2013 | Siamwalla et al. |
| 2014/0101193 A1 | 4/2014 | Dorohonceanu et al. |

OTHER PUBLICATIONS

U.S. Appl. No. 61/546,351, filed on Oct. 12, 2011.
International Preliminary Report on Patentability in International Application No. PCT/US13/63269, mailed Apr. 16, 2015, 8 pages.

* cited by examiner

GENERATING SNIPPETS FOR PROMINENT USERS FOR INFORMATION RETRIEVAL QUERIES

CROSS-REFERENCE TO RELATED APPLICATIONS

This application is a continuation of U.S. patent application Ser. No. 13/645,144, filed Oct. 4, 2012, the disclosure of which is expressly incorporated herein by reference in its entirety.

BACKGROUND

The present disclosure relates to searching.

Search engines aim to identify resources (e.g., images, audio, video, web pages, text, documents) that are relevant to a user's needs and to present information about the resources in a manner that is most useful to the user. Search engines return a set of search results in response to a user submitted text query. For example, in response to an image search text query, the search engine returns a set of search results identifying resources responsive to the query.

SUMMARY

In general, innovative aspects of the subject matter described in this specification can be embodied in methods including the actions of receiving trigger query data, the trigger query data identifying one or more trigger queries and one or more sets of authoritative users, each set of authoritative users being associated with a respective trigger query, providing a plurality of trigger query and authoritative user pairs, each trigger query and authoritative user pair identifying a trigger query and an authoritative user from a set of authoritative users associated with the trigger query, for each trigger query and authoritative user pair: generating a snippet based on user data, the user data being associated with the authoritative user in one or more computer-implemented services, each snippet being specific to the trigger query and specific to the authoritative user; and storing one or more snippets in computer-readable memory, each snippet being associated with the trigger query and the authoritative user for which the snippet was generated. Other implementations of this aspect include corresponding systems, apparatus, and computer programs, configured to perform the actions of the methods, encoded on computer storage devices.

These and other implementations may each optionally include one or more of the following features: generating a snippet based on user data includes: retrieving a plurality of text pieces associated with the authoritative user, each text piece having been generated from the user data, identifying one or more snippet pieces from the plurality of text pieces based on the trigger query, and appending two or more snippet pieces together to provide the snippet; actions further include determining that the snippet is insufficient and in response: selecting a snippet piece to append to the snippet, determining that the snippet piece is to be appended to the snippet, and appending the snippet piece to the snippet; determining that the snippet piece is to be appended to the snippet is performed based on a similarity score that reflects a similarity between the snippet and the snippet piece; appending the snippet piece to the snippet includes removing a previously appended snippet piece from the snippet piece and appending the snippet piece to the snippet; the text pieces are generated from the user data based on cleaning text that is provided in the user data; actions further include, for at least one trigger query and authoritative user pair, determining that the snippet is insufficient and in response identifying another snippet associated with the authoritative user to be used as the snippet; the user data includes profile data associated with a profile of the authoritative user; the user data includes item data associated with one or more items of digital content distributed by the authoritative user using a computer-implemented social networking service; and actions further include providing the one or more snippets for presentation to a user.

Particular implementations of the subject matter described in this specification can be implemented so as to realize one or more of the following advantages. In some examples, the display of authoritative users and associated snippets in search results enable users to discover and connect with other users of computer-implemented services. This improves user engagement with computer-implemented services. In some examples, displayed snippets are relevant to the search query and can be based on recent information. In some examples, snippets can have the appearance that they were provided from a larger body of text associated with the authoritative user and/or the search query.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Implementations of the present disclosure are generally directed to including authoritative users in search results. More particularly, implementations of the present disclosure are directed to generating snippets to display with one or more authoritative users in search results. In some examples, a snippet is a group of text that provides a pseudo-biography of an authoritative user with respect to a search query. In some examples, the snippet includes partial sentences, or sentence fragments, providing a pseudo-biography, as opposed to a biography having complete sentences. In some examples, snippets are generated based on user data associated with a particular authoritative user. In some examples, the user data includes profile data and/or item data associated with the particular authoritative user. In some examples, text pieces are provided for the authoritative user from the user data. In some examples, snippet pieces are provided from the text pieces and a snippet is generated by appending two or more snippet pieces together. In some examples, each snippet is specific to an authoritative user and is specific to a search query.

In some implementations, it is determined whether a received search query triggers the display of authoritative users. If the received search query triggers the display of authoritative users, authoritative user data that can be associated with the search query is transmitted for display to a searching user. In some examples, the authoritative user data includes query-specific and authoritative user-specific snippets. In some examples, a trigger query database is provided and includes one or more trigger queries, each trigger query being associated with one or more authoritative users. A search query can be cross-referenced to trigger queries stored in the trigger query database. If the search query matches a trigger query, a set of authoritative users and data associated with the authoritative users (e.g., snippets) can be provided for display to the searching user that submitted the search query. In some examples, an authoritative user is a user of one or more computer-implemented services, e.g., a social networking service, that has been determined to be authoritative, e.g., an expert, on one or more topics that can be associated with one or more queries.

Figure 1:
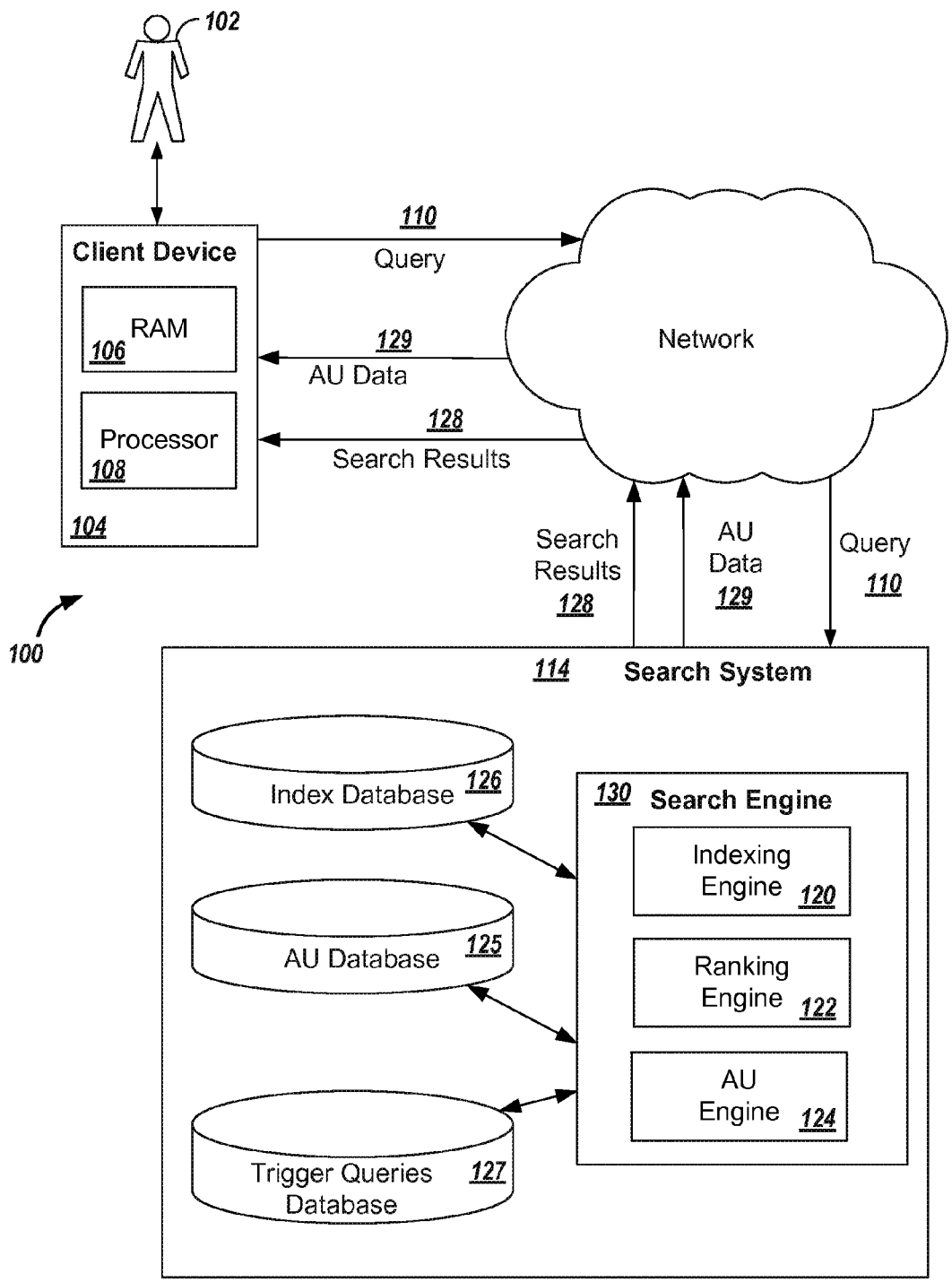
FIG. 1 depicts an example information retrieval system.

FIG. 1 depicts an example information retrieval system 100. The system 100 provides search results relevant to submitted queries as can be implemented in the Internet, an intranet, or another client and server environment. In accordance with the present disclosure, the system 100 also provides authoritative users relevant to the submitted queries, and provide snippets to display with authoritative users. In some examples, a snippet includes a short descriptive text associated with an authoritative user. The system 100 is an example of an information retrieval system in which the systems, components, and techniques described below can be implemented.

A user 102 can interact with a search system 114 through a client device 104. For example, the client device 104 can be a computing device coupled to the search system 114 through a local area network (LAN) or wide area network (WAN), e.g., the Internet. In some implementations, the search system 114 and the client device 104 can be one machine. For example, a user can install a desktop search application on the client device 104. The client device 104 will generally include a random access memory (RAM) 106 and a processor 108.

The client device 104 can include any type of computing device such as a desktop computer, a tablet computer, a laptop computer, a handheld computer, a personal digital assistant (PDA), a cellular telephone, a network appliance, a camera, a smart phone, an enhanced general packet radio service (EGPRS) mobile phone, a media player, a navigation device, an electronic messaging device, a game console, or a combination of any two or more of these data processing devices or other appropriate data processing devices. In some examples, the search system 114 can include one or more server systems.

A user 102 can submit a query 110 to the search system 114. When the user 102 submits a query 110, the query 110 is transmitted through a network to the search system 114. The search system 114 can be implemented as, for example, one or more computer programs running on one or more computers (e.g., servers) in one or more locations that are coupled to each other through a network. In some implementations, the search system 114 includes an authoritative user (AU) database 125, an index database 126, a trigger queries database 127 and a search engine 130. In some examples, the search engine 130 includes an indexing engine 120, a ranking engine 122 and an authoritative user (AU) engine 124. The search system 114 responds to the query 110 by generating search results 128, which are transmitted through the network to the client device 104 in a form that can be presented to the user 102 (e.g., as a search results web page to be displayed in a web browser running on the client device 104). In some implementations, the search system 114 can further respond to the query 110 by identifying one or more authoritative users, and can transfer data 129 associated with the one or more authoritative users through the network to the client device 104 in a form that can be presented to the user 102 (e.g., within the search results web page to be displayed in a web browser running on the client device 104).

When the query 110 is received by the search engine 130, the search engine 130 identifies resources that match, or are responsive to the query 110 and can identify one or more authoritative users responsive to the query 110. In the depicted example, the indexing engine 120 indexes resources (e.g., web pages, images, or news articles on the Internet) found in a collection of content and the index database 126 stores the index information. The ranking engine 122 (or other software) is operable to rank resources that match the query 110, such that search results associated with the results can be displayed in a rank order. The indexing and ranking of the resources can be performed using conventional or other techniques. The authoritative user engine 124 can access the trigger queries database 127 to determine whether one or more authoritative users are to be displayed with the search results. The search system 114 can transmit the search results 128 through the network to the client device 104 for presentation to the user 102. If one or more authoritative users are to be displayed with the search results, the search system 114 can transmit the data 129 associated with the one or more authoritative users through the network to the client device 104 for presentation to the user 102. The trigger queries database 127 of FIG. 1 can be provided based on authoritative user data. In some examples, the trigger queries database 127 provides a list of queries that, if received as search queries, triggers the display of one or more authoritative users.

In accordance with implementations of the present disclosure, one or more snippets can be generated and can be associated with an authoritative user. In some implementations, authoritative user data from the AU database 125 can be processed in view of authoritative users and trigger queries provided in the trigger queries database 127 to generate the snippets. Each snippet can correspond to an authoritative user, trigger query pair and can be stored in the trigger queries database 127 in association with the authoritative user, trigger query pair. In this manner, if a received query (e.g., the query 110) matches a trigger query, an authoritative user and an associated snippet can be determined to be responsive to the trigger query and can be provided for presentation in the search results.

Figure 2:
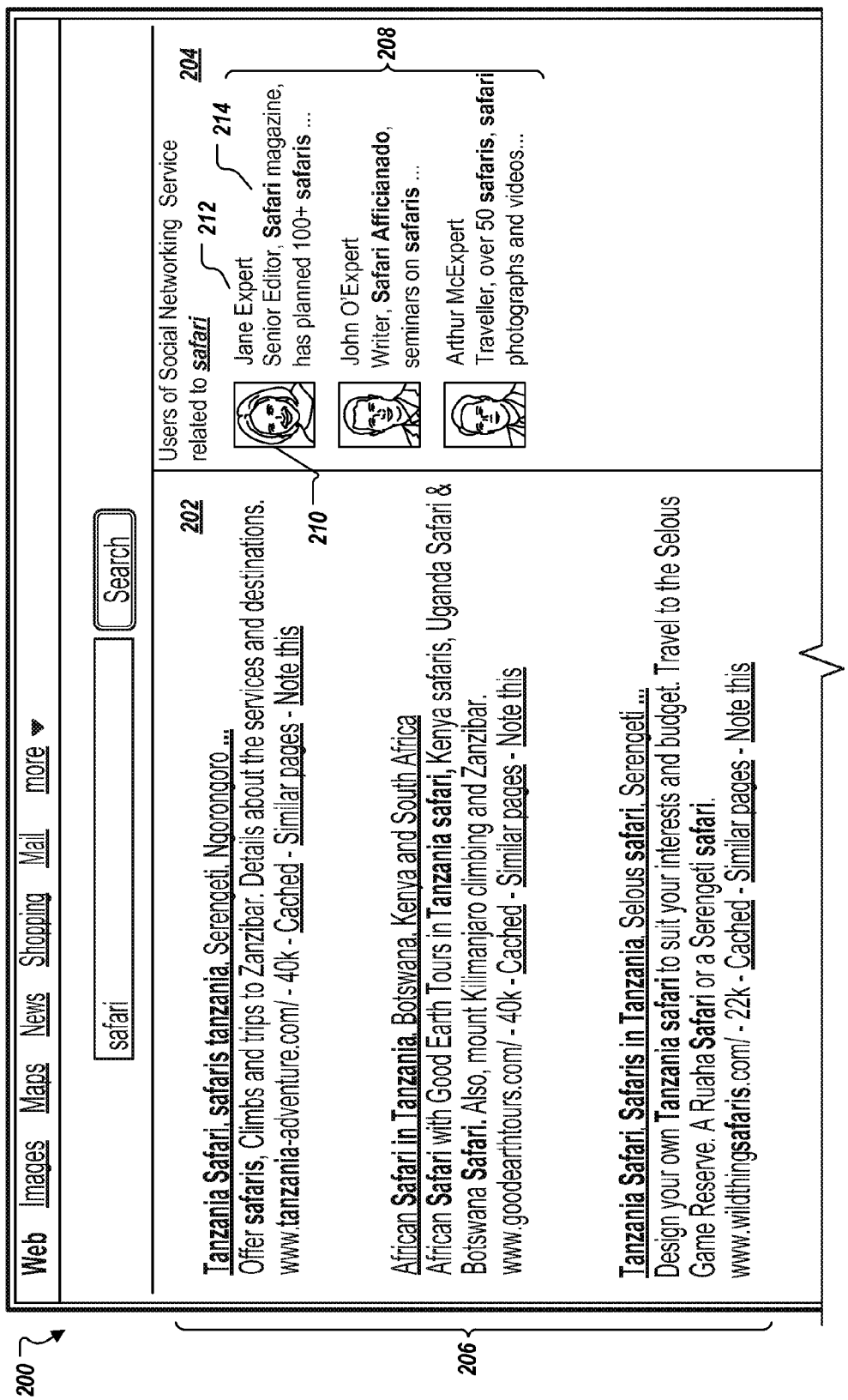
FIG. 2 depicts an example search results page including a search results portion and an authoritative users portion.

FIG. 2 depicts an example search results page 200 including a search results portion 202 and an authoritative users portion 204. The search results page 200 displays example search results in the search results portion 202. The example search results are responsive to the example query "safari." In the depicted example, the displayed search results include web results 206 that are responsive to the example query. It is appreciated, however, that other types of search results (e.g., social search results) can be displayed. In response to the example query, authoritative users 208 are displayed in the authoritative users portion 204. In the depicted example, the authoritative users 208 include "Jane Expert," "John O'Expert" and "Arthur McExpert."

In accordance with implementations of the present disclosure, the example query "safari" of FIG. 2 has been compared to one or more stored trigger queries and has been determined to match, or to be sufficiently similar to a trigger query. Consequently, a set of authoritative users has been defined and includes at least the authoritative users 208 displayed in the authoritative users portion 204. In the depicted example, each authoritative user 208 is identified based on a profile image 210 and a profile name 212 associated with a profile of the respective authoritative user 208 within the computer-implemented service (e.g., the social networking service). Further, a snippet 214 is displayed for each authoritative user 208. As discussed herein, each snippet 214 is specific to the respective authoritative user and the query. As noted above, the example query "safari" had been submitted. Consequently, each snippet is specific to the query "safari." In some implementations, the query and synonyms and/or variants thereof can be highlighted within the snippets 214 to visually indicate that the snippets 214 are query-specific. In the depicted example, the terms "safari" and "safaris" are bolded as a highlight. It is appreciated that other highlighting techniques can be implemented.

Implementations of snippet generation are now described in detail. In some implementations, a trigger queries database can provide a plurality of trigger queries (TQs) and one or more authoritative users (AUs) associated therewith.

In some examples, a TQ includes a query that can be associated with one or more topics and that triggers the display of one or more AUs in response thereto. In some examples, a TQ can include one or more terms. In some examples, an AU is a user of one or more computer-implemented services (e.g., a social networking service) that has been determined to be authoritative (e.g., an expert) on one or more topics that can be associated with one or more TQs. For example, a first user and a second user can include popular musicians, where the first user is a rap artist and the second user is a country artist. Both the first user and the second user can be determined to be an AU with respect to the example topic "music." In some examples, the first user can alternatively or additionally be determined to be an AU with respect to the example topics "rap" and/or "rap music." In some examples, the second user can alternatively or additionally be determined to be an AU with respect to the example topics "country" and/or "country music."

In some examples, tuples can be provided to associate a particular TQ to one or more AUs. By way of example, a trigger query database can include trigger queries $TQ_1$, $TQ_2$, $TQ_3$ and authoritative users $AU_A$-$AU_L$ in the following example tuples:

$TQ_1$; $AU_A$, $AU_B$, $AU_E$, $AU_G$
$TQ_2$; $AU_A$, $AU_C$, $AU_D$, $AU_I$, $AU_J$, $AU_L$
$TQ_3$; $AU_E$, $AU_F$, $AU_H$, $AU_J$, $AU_K$

For example, if $TQ_1$ is received as a search query, $AU_A$, $AU_B$, $AU_E$ and/or $AU_G$ can be provided for potential display to the searching user, if $TQ_2$ is received as a search query, $AU_A$, $AU_C$, $AU_D$, $AU_I$, $AU_J$ and $AU_L$ can be provided for potential display to the searching user, and, if $TQ_3$ is received as a search query, $AU_E$, $AU_F$, $AU_H$, $AU_J$ and $AU_K$ can be provided for potential display to the searching user.

A snippet can be generated for each authoritative user, trigger query pair provided in the trigger query database. In some examples, a snippet is a group of text that provides a pseudo-biography of an authoritative user. In some examples, a snippet can include one or more terms that are provided from data associated with a respective AU. In some examples, a snippet includes is a short descriptive text that can be displayed next to profile data (e.g., a profile image, a profile name) associated with a respective AU. In some examples, the profile data and the snippet can define a dynamic abstract of the AU in view of a particular topic.

Continuing with the example above, the snippets ($S_{p,n}$) for each of the following example $AU_p$, $TQ_n$ pair can be generated:

$S_{A,1} \rightarrow AU_A$, $TQ_1$  $S_{J,2} \rightarrow AU_J$, $TQ_2$
$S_{B,1} \rightarrow AU_B$, $TQ_1$  $S_{L,2} \rightarrow AU_L$, $TQ_2$
$S_{E,1} \rightarrow AU_E$, $TQ_1$  $S_{E,3} \rightarrow AU_E$, $TQ_3$
$S_{G,1} \rightarrow AU_G$, $TQ_1$  $S_{F,3} \rightarrow AU_F$, $TQ_3$
$S_{A,2} \rightarrow AU_A$, $TQ_2$  $S_{H,3} \rightarrow AU_H$, $TQ_3$
$S_{C,2} \rightarrow AU_C$, $TQ_2$  $S_{J,3} \rightarrow AU_J$, $TQ_3$
$S_{D,2} \rightarrow AU_D$, $TQ_2$  $S_{K,3} \rightarrow AU_K$, $TQ_3$
$S_{I,2} \rightarrow AU_I$, $TQ_2$ For example, snippet $S_{A,1}$ can be generated for $AU_A$ based on $TQ_1$, while snippet $S_{A,2}$ can be generated for $AU_A$ based on $TQ_1$. In this manner, each snippet is AU-specific and TQ-specific. That is, each snippet is a group of text that provides a pseudo-biography of a respective AU in view of a particular TQ.

For each AU provided in the trigger queries database, user data can be received. In some implementations, the user data can be received from one or more computer-implemented services that the AU participates in. Example computer-implemented services can include a social networking service, an electronic messaging service, a document sharing service, an image sharing service, a chat service or any other appropriate computer-implemented service. For purposes of discussion, and by way of example, a social networking service will be referenced to illustrate implementations of the present disclosure.

In some implementations, and as part of an AU's interaction with a social networking service, the AU can provide profile data that can be shared with one or more other users of the social networking service. In some examples, the profile data can include personal information, educational information and/or professional information. In some implementations, the social networking service can provide a profile page for each user, including the AU, on which the AU can provide profile data (e.g., an "About" page of a profile associated with the AU). In some examples, the profile page can include profile sections, each profile section being associated with a topic. Example profile sections can include occupation, employment, work experience, education, places lived, hobbies and personal biography. For example, the AU can provide a textual description that serves as a personal biography. As another example, the AU can provide a textual description of hobbies and/or other activities that the AU is interested or participates in. As another example, the AU can provide a textual description of schools, colleges, universities and/or other institutes of learning that the AU has attended or has some affiliation with, and/or qualifications (e.g., certificates, degrees) earned. As another example, the AU can provide a textual description of their profession and/or professional societies that they participate in and/or are members of.

In some implementations, each profile section can include a rank that reflects the importance of the particular profile section to other profile sections. For example, the following descending order of importance can be provided: occupation, education, work experience, personal biography, hobbies, employment and places lived. It is appreciated that other orders of importance can be provided.

In some examples, and as part of an AU's interaction with a social networking service, the AU can distribute items (e.g., posts) to other users of the social networking service. An item includes digital content. In some examples, digital content can include text, digital images, digital videos, hyperlinks to network-accessible documents (e.g., web pages), digital audio and any other appropriate digital content. For example, the AU can generate and distribute posts using the social networking service, where one or more posts include text and other digital content. As another example, the AU can generate digital content as a response to a post distributed by another user of the social networking service. For example, the AU can receive a post generated by another user and can comment on the post, the comment including text and/or other digital content.

In accordance with implementations of the present disclosure, snippets can be generated in phases. For each AU provided in the trigger query database, profile data and item data associated with the AU within a computer-implemented service (e.g., the social networking service) can be received. In some examples, the profile data and the item data can be received from a database associated with the social networking service and/or any other appropriate database (e.g., the AU database 125 of FIG. 1). The profile data includes profile information provided by the AU and the item data includes digital content distributed by the AU within the social networking service (e.g., posts, comments on posts).

For each AU, the profile data and the item data are processed to generate one or more text pieces. In some examples, each text piece is provided as a string of text including one or more words. In some examples, the profile data and the item data are processed to provide text pieces and to clean the text pieces. For example, the profile data and the item data can be processed to remove redundant punctuation, offensive words, hyperlinks and the like. In some implementations, text pieces that are generated based on profile data can be sorted based on an order of importance of respective profile sections, from which the text pieces are derived. In some examples, a text piece derived from the item data corresponds to a single item (e.g., post, comment on a post). The text pieces are associated with the particular AU and are stored in computer-readable memory.

Snippet pieces are generated for each AU provided in the trigger queries database. For each trigger query provided in the trigger queries database, a set of AUs can be identified. Continuing with the example above, for $TQ_1$, the set of AUs includes $AU_A$, $AU_B$, $AU_E$, $AU_G$, for $TQ_2$, the set of AUs includes $AU_A$, $AU_C$, $AU_D$, $AU_F$, $AU_J$, $AU_L$, and for $TQ_3$, the set of AUs includes $AU_E$, $AU_F$, $AU_H$, $AU_J$, $AU_K$. For each TQ, synonyms and/or variants can be provided. In some implementations, synonyms and variants can be received from a database. In some examples, the particular TQ can be provided as an index to a database and the database can return one or more synonyms and/or one or more variants for the TQ. By way of example, a TQ can include "science fiction" and received synonyms and/or variants can include "scifi," "sci fi," "sci-fi," "science" and "fiction."

For each AU and TQ pair ($AU_p$, $TQ_n$), the text pieces associated with the AU ($AU_p$) are processed to provide snippet pieces. In some examples, a snippet piece is a text piece that is determined to be relevant to a particular TQ. In some examples, a snippet piece is generated from each text piece by selecting a part of the text piece that contains at least one of the original TQ, a synonym and/or a variant, if any are present. In this manner, text pieces associated with each AU can each be reviewed in view of a TQ, a synonym and/or a variant to identify text pieces that can be provided as snippet pieces for the particular TQ.

In some examples, words that match a TQ, a synonym and/or a variant are marked between bold tags (e.g., HTML). For example, a TQ can include "sci fi" and the text piece:

> Futurist, Science Fiction Author, Scientist. I promote sci fi movies that discuss the future of humanity when Earth resources are depleted and humans have to travel to other planets and solar systems to survive. This future is not very far from present.

can be provided (e.g., from a personal biography profile section of a profile of an AU). Consequently, an example snippet piece can include "Futurist, <b>Science</b> <b>Fiction</b> Author, Scientist. I promote <b>sci</b> <b>fi</b> movies that discuss the future of humanity . . . "

For each $AU_p$, $TQ_n$ pair the snippet, $S_{p,n}$ is generated based on the snippet pieces associated with $AU_p$ and $TQ_n$. In some examples, snippet pieces for a particular AU and a particular TQ are retrieved. The snippet pieces are processed and snippet pieces can be appended to provide a snippet for the particular $AU_p$, $TQ_n$ pair. In some examples, appended snippet pieces are separated by an ellipsis.

In some implementations, the snippet can be initially generated based on snippet pieces that were provided from profile data and that include the original TQ. In some examples, if the snippet generated based on the profile data and original TQ is determined to be insufficient (e.g., is too short), the snippet can be further generated based on snippet pieces that were provided from item data and that include the original TQ. In some examples, if the snippet generated based on the item data and original TQ is determined to be insufficient (e.g., is too short), the snippet can be further generated based on snippet pieces that were provided from profile data and/or item data and that include a synonym and/or variant of the original TQ. In some examples, if the snippet generated based on the profile data and/or item data and synonym and/or variant is determined to be insufficient (e.g., is too short), the snippet can be further generated from snippet pieces originating from the profile data and/or the item data. In some examples, if the snippet generated based on the profile data and/or item data is determined to be insufficient (e.g., is too short), the snippet can be further generated based on a snippet smearing routine, discussed in further detail below.

In some implementations, a snippet can include an initial snippet piece. In some examples, the initial snippet piece is sought from the profile data and can subsequently sought from item data and eventually snippet smearing, as discussed above.

In some examples, the initial snippet piece can be selected from snippet pieces that originated from the profile data and that include the original TQ. In some examples, the initial snippet piece can be selected based on originating from a higher ranking profile section. For example, a first snippet piece and a second snippet piece can each include the original TQ. It can be determined that the first snippet piece originated from occupation profile section and that the second snippet piece originated from an employment profile section. Because, for example, the occupation profile section is ranked higher than the employment profile section, the first snippet piece is provided as the initial snippet piece.

In generating the snippet, additional snippet pieces can be appended to the initial snippet piece and further snippet pieces are appended until the snippet is determined to be sufficient. In some examples, the sufficiency of a snippet can be determined based on a number of characters provided in the snippet. In some examples, the number of characters provided in the snippet can be compared to a threshold number of characters. If the number of characters exceeds the threshold number of characters, the snippet can be determined to be sufficient. If the number of characters does not exceed the threshold number of characters, the snippet can be determined to be insufficient.

In some implementations, each time a snippet piece is to be appended, a similarity coefficient can be computed between the snippet being built and the snippet piece to be appended. In some examples, the similarity coefficient can be determined as an edit distance between the snippet and the snippet piece that is to be appended. In some examples, one of a plurality of decisions is made depending on the similarity coefficient value, whether the snippet already contains the original TQ, whether the snippet piece to be appended contains the original TQ, words already provided in the snippet, and words provided in the snippet piece. Example decisions reduce redundancy in snippet content and include: do not append the snippet piece, replace the current snippet with the snippet piece, remove previously appended snippet piece and append the snippet piece, or append the snippet piece.

For example, if a similarity score between a snippet and a snippet piece that is to be appended to the snippet indicates that the snippet and the snippet pieces are similar (e.g., an edit distance is below a threshold edit distance), it can be determined that the snippet piece is not to be appended to the snippet. As another example, if a similarity score between a snippet and a snippet piece that is to be appended to the snippet indicates that the snippet and the snippet pieces are dissimilar (e.g., an edit distance is above a threshold edit distance), it can be determined that the snippet piece is to be appended to the snippet. As another example, if it is determined that the previously appended snippet piece does not include the original TQ and that the snippet piece that is to be appended includes the original TQ, the previously appended snippet piece can be removed and the snippet piece including the original TQ can be appended.

In some examples, it can be determined that a snippet generated by appending snippet pieces is still insufficient (e.g., too short). Consequently, snippet smearing can be implemented in an effort to provide a sufficient snippet. In some examples, snippet smearing includes determining whether one or more other snippets are provided for the AU (e.g., for another TQ). If another snippet is provided for the AU, the other snippet can be reviewed to determine whether the snippet is associated with a TQ that may be synonymous to the subject TQ. If the other snippet is associated with a TQ that may be synonymous to the subject TQ, the snippet for the subject TQ can be provided as the other snippet. In this manner, the same snippet can be provided for the AU different, but synonymous TQs.

Non-empty snippets are stored and are associated with the subject AU, TQ pair. For example, the snippets can be stored in the AU database 125 of FIG. 1 and can be provided for display in response to a TQ being received, as discussed herein.

Figure 3A:
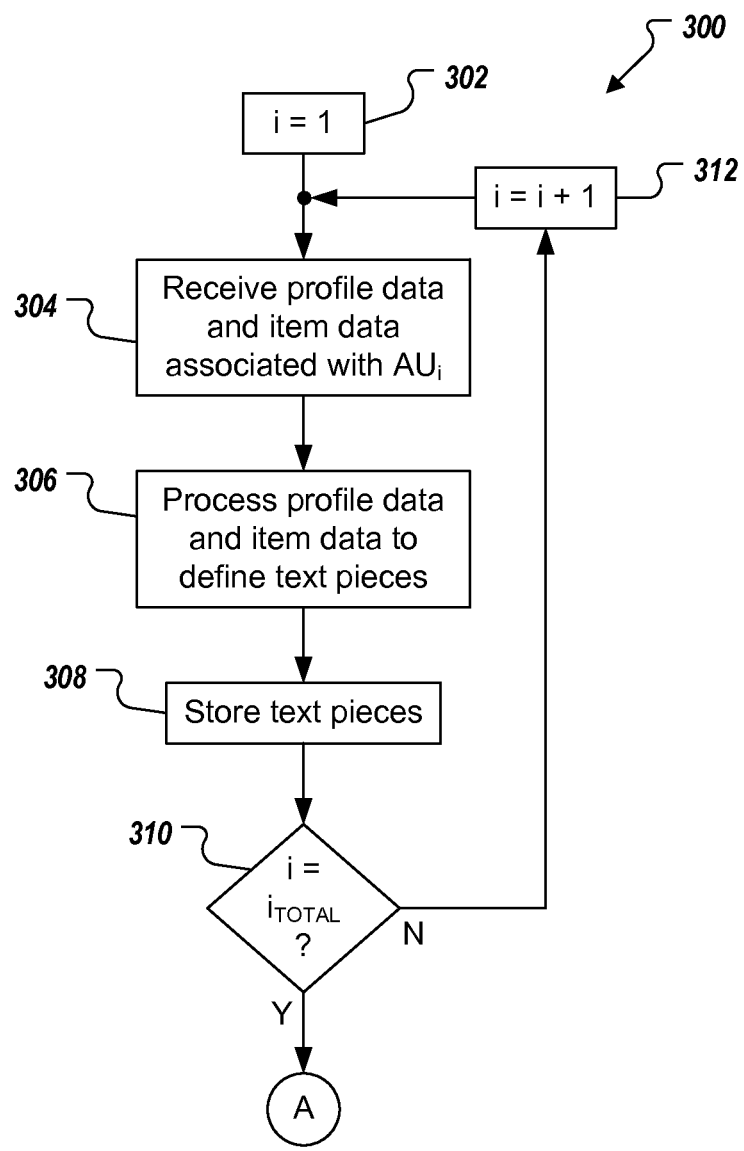
FIGS. 3A and 3B depict a flow diagram of an example process that can be executed in implementations of the present disclosure.
Figure 3B:
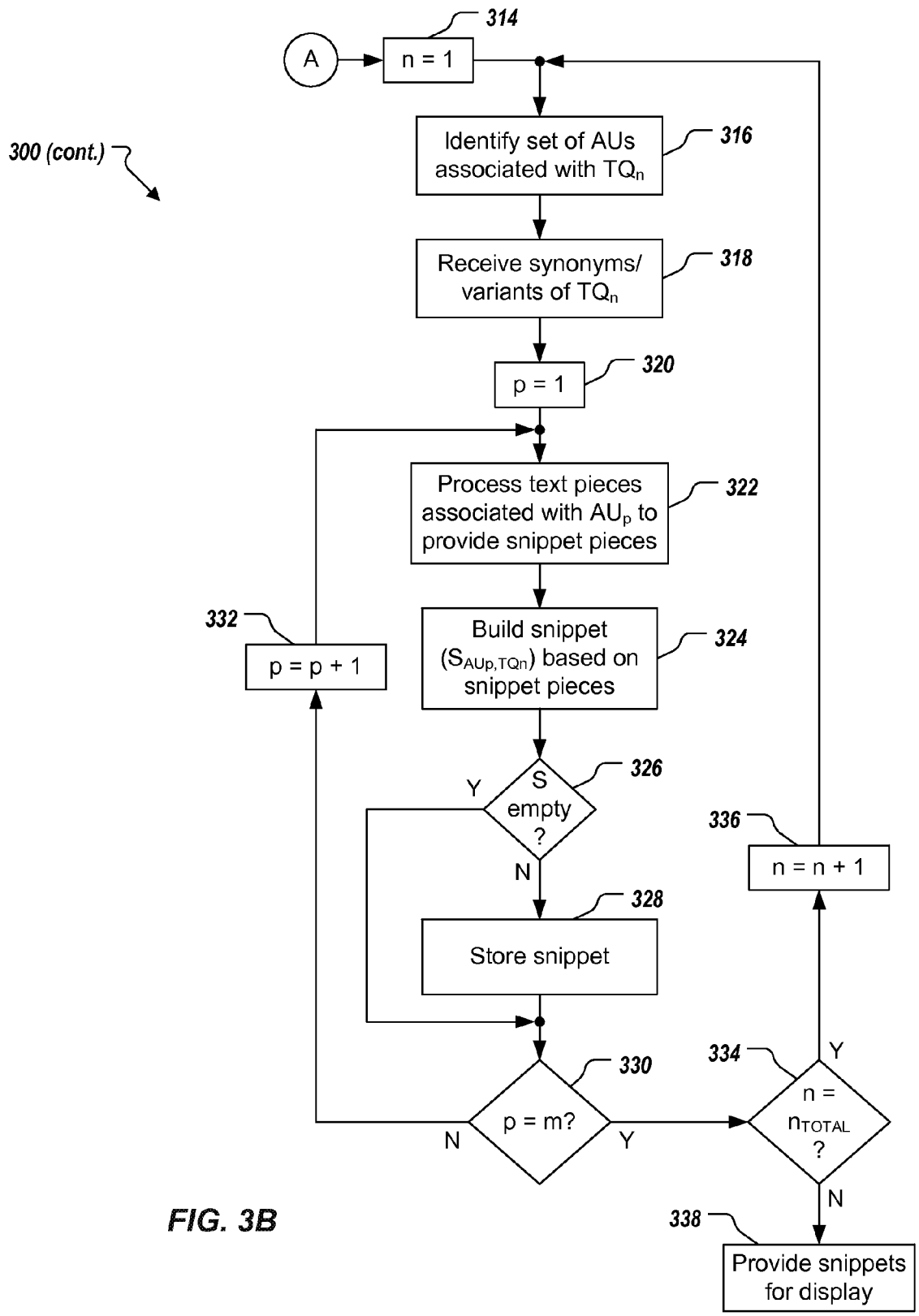

FIGS. 3A and 3B depict a flow diagram of an example process 300 that can be executed in implementations of the present disclosure. In some implementations, the example process 300 can include operations that are performed using one or more computer programs executed using one or more data processing apparatus. The example process 300 can be executed to provide snippets for display.

Beginning with FIG. 3A, a counter i is set equal to 1 (302). Profile data and item data associated with $AU_i$ is received (304). For example, the profile data and the item data can be retrieved from one or more databases based on an identifier associated with $AU_i$. The profile data and the item data are processed to define one or more text pieces associated with $AU_i$ (306). The text pieces are stored (308).

For example, the text pieces can be stored in a text piece database, with each text piece being associated with $AU_i$. It is determined whether the counter i is equal to a value $i_{TOTAL}$ (310). In some examples, $i_{TOTAL}$ can indicate the total number of AUs provided (e.g., in the AU database 125 of FIG. 1). Accordingly, the counter i is used to determine whether text pieces have been defined for each of the AUs provided. If the counter i is not equal to $i_{TOTAL}$, the counter i is incremented (312) and the example process 300 loops back.

Moving to FIG. 3B, if the counter i is equal to $i_{TOTAL}$, a counter n is set equal to 1(314). The counter n is used to determine whether snippets have been built for each TQ provided (e.g., in the TQ database 127 of FIG. 1). A set of m AUs associated with $TQ_n$ are identified (316). For example, and continuing with the example above, for $TQ_1$, the set of AUs includes $AU_A$, $AU_B$, $AU_E$, $AU_G$. Consequently, the set of AUs associated with $TQ_1$ includes four AUs (n=1; m=4). Synonyms and/or variants of $TQ_n$ are received (318). A counter p is set equal to 1 (320). The counter p is used to determine whether snippets have been built for each AU in the set of m AUs associated with $TQ_n$. Text pieces associated with $AU_p$ are processed to provide snippet pieces (322). A snippet ($S_{AUp, TQn}$) is built based on the snippet pieces (324). It is determined whether the snippet is empty (326). If it is determined that the snippet is not empty, the snippet is stored (328) and the example process 300 continues at action 330. If it is determined that the snippet is empty, the examples process 300 continues at action (330).

It is determined whether the counter p is equal to m (330). That is, it is determined whether snippets have been built for each AU in the set of m AUs associated with $TQ_n$. If the counter p is not equal to m, the counter p is incremented (332) and the example process 300 loops back. If the counter p is equal to m, it is determined whether the counter n is equal to a value $n_{TOTAL}$ (334). That is, it is determined whether snippets have been built for each TQ provided. If the counter n is not equal to $n_{TOTAL}$, the counter n is incremented 336 and the example process 300 loops back. If the counter n is equal to $n_{TOTAL}$, the snippets are provided for display (338). For example, the snippets can be stored and can be made available for display in response to received queries.

Figure 4A:
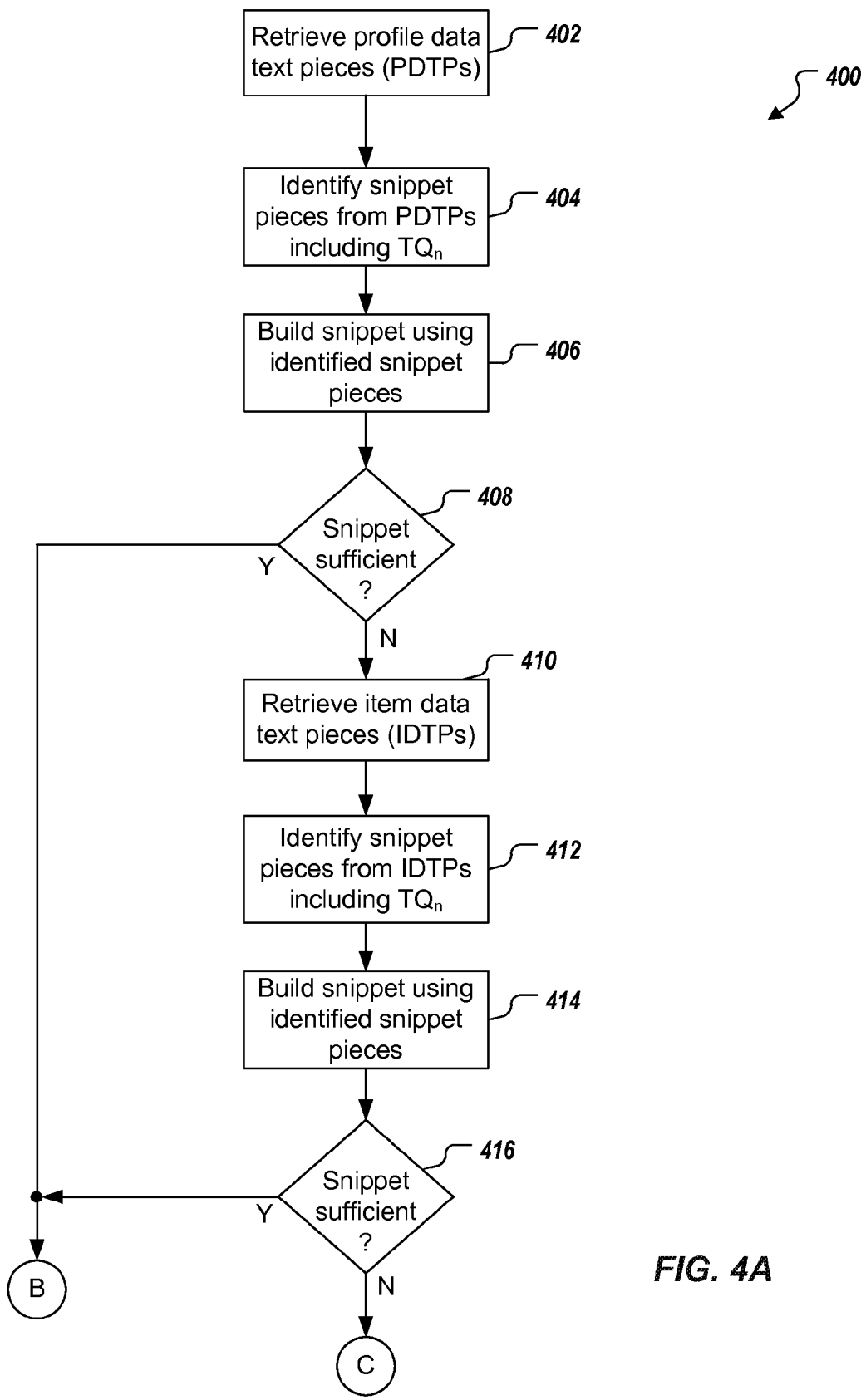
FIGS. 4A and 4B depict a flow diagram of an example process that can be executed in implementations of the present disclosure.
Figure 4B:
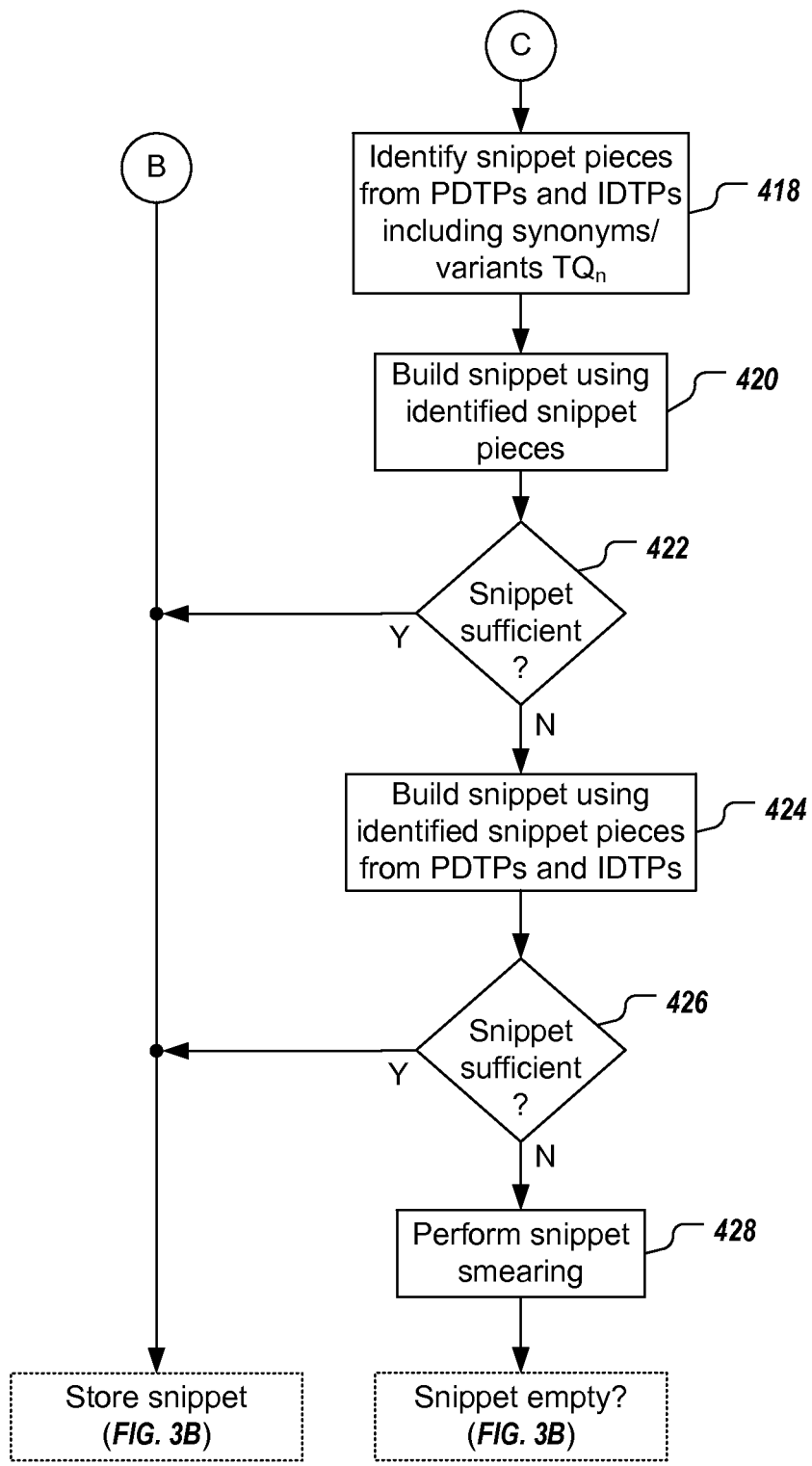

FIGS. 4A and 4B depict a flow diagram of an example process 400 that can be executed in implementations of the present disclosure. In some implementations, the example process 400 can include operations that are performed using one or more computer programs executed using one or more data processing apparatus. The example process 400 can be executed to build snippets. In some examples, the example process 400 can correspond to sub-actions that can be performed in the action 324 of FIG. 3B.

Profile data text pieces (PDTPs) are retrieved (402). For example, the PDTPs can be retrieved for a particular AU (e.g., $AU_p$) from a text piece database. Text pieces that include a particular TQ (e.g., $TQ_n$) are identified as snippet pieces (404). A snippet is built using the snippet pieces (406). It is determined whether the snippet is sufficient (408). If it is determined that the snippet is sufficient, the example process 400 loops to the action 328 of FIG. 3B. If it is determined that the snippet is not sufficient, the item data text pieces (IDTPs) are retrieved (410). For example, the IDTPs can be retrieved for the particular AU (e.g., $AU_p$) from the text piece database. Text pieces that include the particular TQ (e.g., $TQ_n$) are identified as snippet pieces (412). The snippet is built (or extended) using the identified snippet pieces (414). It is determined whether the snippet is sufficient (416). If it is determined that the snippet is sufficient, the example process 400 loops to the action 328 of FIG. 3B.

If it is determined that the snippet is not sufficient, snippet pieces from the PDTPs and the IDTPs that include synonyms and/or variants of the particular TQ (e.g., $TQ_n$) are identified (418). The snippet is built (or extended) using the identified snippet pieces (420). It is determined whether the snippet is sufficient (422). If it is determined that the snippet is sufficient, the example process 400 loops to the action 328 of FIG. 3B. If it is determined that the snippet is not sufficient, the snippet is built (or extended) using identified snippet pieces from the PDTPs and the IDTPs (424). It is determined whether the snippet is sufficient (426). If it is determined that the snippet is sufficient, the example process 400 loops to the action 328 of FIG. 3B. If it is determined that the snippet is not sufficient, snippet smearing is performed (428) and the example process 400 loops to the action 326 of FIG. 3B.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer can also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method executed by one or more processors, the method comprising:
   receiving, by the one or more processors, trigger query data, the trigger query data identifying one or more trigger queries and one or more sets of authoritative users, each set of authoritative users being associated with a respective trigger query;
   generating, by the one or more processors, a first trigger query and authoritative user pair, the first trigger query and authoritative user pair identifying a first trigger query and an authoritative user from a set of authoritative users associated with the trigger query;
   generating, by the one or more processors, a second trigger query and authoritative user pair, the second trigger query and authoritative user pair identifying a second trigger query and the authoritative user;
   generating, by the one or more processors, a first snippet based on user data, the user data being associated with the authoritative user in one or more computer-implemented services, the first snippet being specific to the first trigger query and specific to the authoritative user;
   generating, by the one or more processors, a second snippet based the user data, the second snippet being different from the first snipped, and being specific to the second trigger query and specific to the authoritative user; and
   storing, by the one or more processors, the first and second snippets in computer-readable memory.

2. The method of claim 1, wherein generating the first snippet based on user data comprises:
   retrieving a plurality of text pieces associated with the authoritative user, each text piece having been generated from the user data;
   identifying one or more snippet pieces from the plurality of text pieces based on the trigger query; and
   appending two or more snippet pieces together to provide the first snippet.

3. The method of claim 2, further comprising determining that the first snippet is insufficient and in response:
   selecting a snippet piece to append to the first snippet,
   determining that the snippet piece is to be appended to the first snippet, and
   appending the snippet piece to the first snippet.

4. The method of claim 3, wherein determining that the snippet piece is to be appended to the first snippet is performed based on a similarity score that reflects a similarity between the first snippet and the snippet piece.

5. The method of claim 3, wherein appending the snippet piece to the first snippet comprises removing a previously appended snippet piece from the first snippet piece and appending the snippet piece to the first snippet.

6. The method of claim 2, wherein the text pieces are generated from the user data based on cleaning text that is provided in the user data.

7. The method of claim 1, wherein modifying the first snippet to provide a revised snippet comprises identifying the second snippet to be used as the revised snippet.

8. The method of claim 1, wherein the user data comprises profile data associated with a profile of the authoritative user.

9. The method of claim 1, wherein the user data comprises item data associated with one or more items of digital content distributed by the authoritative user using a computer-implemented social networking service.

10. The method of claim 1, further comprising providing the one or more snippets for presentation to a user.

11. A system comprising:
one or more processors; and a data store coupled to the one or more processors having instructions stored thereon which, when executed by the one or more processors, causes the one or more processors to perform operations comprising:
receiving, by the one or more processors, trigger query data, the trigger query data identifying one or more trigger queries and one or more sets of authoritative users, each set of authoritative users being associated with a respective trigger query;
generating, by the one or more processors, a first trigger query and authoritative user pair, the first trigger query and authoritative user pair identifying a first trigger query and an authoritative user from a set of authoritative users associated with the trigger query;
generating, by the one or more processors, a second trigger query and authoritative user pair, the second trigger query and authoritative user pair identifying a second trigger query and the authoritative user;
generating, by the one or more processors, a first snippet based on user data, the user data being associated with the authoritative user in one or more computer-implemented services, the first snippet being specific to the first trigger query and specific to the authoritative user,
generating, by the one or more processors, a second snippet based the user data, the second snippet being different from the first snipped, and being specific to the second trigger query and specific to the authoritative user; and
storing, by the one or more processors, the first and second snippets in computer-readable memory.

12. The system of claim 11, wherein generating the first snippet based on user data comprises:
retrieving a plurality of text pieces associated with the authoritative user, each text piece having been generated from the user data;
identifying one or more snippet pieces from the plurality of text pieces based on the trigger query; and
appending two or more snippet pieces together to provide the first snippet.

13. The system of claim 12, wherein the operations further comprise determining that the first snippet is insufficient and in response:
selecting a snippet piece to append to the first snippet, determining that the snippet piece is to be appended to the first snippet, and appending the snippet piece to the first snippet.

14. The system of claim 13, wherein determining that the snippet piece is to be appended to the first snippet is performed based on a similarity score that reflects a similarity between the first snippet and the snippet piece.

15. The system of claim 13, wherein appending the snippet piece to the first snippet comprises removing a previously appended snippet piece from the first snippet piece and appending the snippet piece to the first snippet.

16. A non-transient computer readable medium storing instructions that, when executed by one or more processors, cause the one or more processors to perform operations comprising:
receiving, by the one or more processors, trigger query data, the trigger query data identifying one or more trigger queries and one or more sets of authoritative users, each set of authoritative users being associated with a respective trigger query;
generating, by the one or more processors, a first trigger query and authoritative user pair, the first trigger query and authoritative user pair identifying a first trigger query and an authoritative user from a set of authoritative users associated with the trigger query;
generating, by the one or more processors, a second trigger query and authoritative user pair, the second trigger query and authoritative user pair identifying a second trigger query and the authoritative user;
generating, by the one or more processors, a first snippet based on user data, the user data being associated with the authoritative user in one or more computer-implemented services, the first snippet being specific to the first trigger query and specific to the authoritative user,
generating, by the one or more processors, a second snippet based the user data, the second snippet being different from the first snipped, and being specific to the second trigger query and specific to the authoritative user; and
storing, by the one or more processors, the first and second snippets in computer-readable memory.

17. The medium of claim 16, wherein generating the first snippet based on user data comprises:
retrieving a plurality of text pieces associated with the authoritative user, each text piece having been generated from the user data;
identifying one or more snippet pieces from the plurality of text pieces based on the trigger query; and
appending two or more snippet pieces together to provide the first snippet.

18. The medium of claim 17, wherein the operations further comprise determining that the first snippet is insufficient and in response:
selecting a snippet piece to append to the first snippet, determining that the snippet piece is to be appended to the first snippet, and
appending the snippet piece to the first snippet.

19. The medium of claim 18, wherein determining that the snippet piece is to be appended to the first snippet is performed based on a similarity score that reflects a similarity between the first snippet and the snippet piece.

20. The medium of claim 18, wherein appending the snippet piece to the first snippet comprises removing a previously appended snippet piece from the first snippet piece and appending the snippet piece to the first snippet.

* * * * *